(12) United States Patent
Baker

(10) Patent No.: US 9,955,303 B2
(45) Date of Patent: Apr. 24, 2018

(54) DETERMINING RELATIVE POSITION WITH A BLE BEACON

(71) Applicant: IP Funding Group, LLC, Lexington, KY (US)

(72) Inventor: Richard L. Baker, Lexington, KY (US)

(73) Assignee: IP Funding Group, LLC, Lexington, KY (US)

( * ) Notice: Subject to any disclaimer, the term of this patent is extended or adjusted under 35 U.S.C. 154(b) by 0 days.

(21) Appl. No.: 15/216,343

(22) Filed: Jul. 21, 2016

(65) Prior Publication Data

US 2017/0026794 A1 Jan. 26, 2017

Related U.S. Application Data

(60) Provisional application No. 62/195,212, filed on Jul. 21, 2015.

(51) Int. Cl.

| | |
|---|---|
| *H04W 24/00* | (2009.01) |
| *H04W 4/02* | (2018.01) |
| *H04L 5/00* | (2006.01) |
| *H04W 4/00* | (2018.01) |
| *H04W 40/24* | (2009.01) |

(Continued)

(52) U.S. Cl.
CPC .......... *H04W 4/023* (2013.01); *H04L 5/0048* (2013.01); *H04W 4/008* (2013.01); *H04W 40/244* (2013.01); *H04W 64/00* (2013.01); *H04B 7/04* (2013.01)

(58) Field of Classification Search
CPC ................................. H04W 64/00; H04W 4/02

USPC ................................. 455/456.1, 456.5, 456.6
See application file for complete search history.

(56) References Cited

U.S. PATENT DOCUMENTS

| | | |
|---|---|---|
| 8,790,186 B1 | 7/2014 | Dethloff et al. |
| 8,847,754 B2 | 9/2014 | Buchheim et al. |
| 8,851,372 B2 | 10/2014 | Zhou et al. |

(Continued)

FOREIGN PATENT DOCUMENTS

| | | |
|---|---|---|
| CN | 101390346 | 3/2009 |
| CN | 102869090 | 1/2013 |

(Continued)

*Primary Examiner* — Temica M Beamer
(74) *Attorney, Agent, or Firm* — Frost Brown Todd LLC

(57) ABSTRACT

A beacon uses a plurality of co-located, unidirectional antennas each to transmit angular and/or ranging reference signals from substantially the same point. In some embodiments, two such antennas transmit the reference signals in substantially opposite directions, and in some embodiments four such antennas transmit in directions that are substantially at right angles to each other. In some embodiments, the transmitted signals overlap so they can be received at a single receiver. Some implementations include a receiver that interprets the reference signals from two or more of the co-located antennas to determine the direction of the receiver is in relative to the beacon or the location of the receiver relative to the beacon. Another implementation uses an omnidirectional antenna to provide ranging information and a rotating, unidirectional antenna to provide directional information. In some of these implementations, the antennas are co-located, while in others, they are separated in space.

20 Claims, 8 Drawing Sheets

(51) Int. Cl.
  *H04W 64/00*     (2009.01)
  *H04B 7/04*      (2017.01)

(56) References Cited

U.S. PATENT DOCUMENTS

| | | |
|---|---|---|
| 8,868,444 B2 | 10/2014 | Morris |
| 8,938,488 B1 | 1/2015 | Sayed |
| 8,942,920 B1 | 1/2015 | Davidson |
| 8,958,985 B1 | 2/2015 | Davidson |
| 8,981,896 B2 | 3/2015 | Smith |
| 8,989,053 B1 | 3/2015 | Skaaksrud et al. |
| 9,002,754 B2 | 4/2015 | Abhyanker |
| 2012/0058775 A1* | 3/2012 | Dupray ............... G01S 5/0257 455/456.1 |
| 2014/0222577 A1 | 8/2014 | Abhyanker |
| 2014/0244514 A1 | 8/2014 | Rodriguez et al. |
| 2014/0349692 A1 | 11/2014 | Zhou et al. |
| 2014/0375421 A1 | 12/2014 | Morrison et al. |
| 2015/0006419 A1 | 1/2015 | Pearson |
| 2015/0088331 A1 | 3/2015 | Fiedler et al. |
| 2015/0097028 A1 | 4/2015 | Bakker et al. |
| 2015/0106294 A1 | 4/2015 | Robinson et al. |
| 2015/0112158 A1 | 4/2015 | He et al. |
| 2015/0112606 A1 | 4/2015 | He et al. |
| 2017/0238140 A9* | 8/2017 | Buchheim ............ H04W 4/026 455/456.1 |

FOREIGN PATENT DOCUMENTS

| | | |
|---|---|---|
| CN | 104053155 | 9/2014 |
| CN | 104063768 | 9/2014 |
| CN | 104217245 | 12/2014 |
| CN | 104268669 | 1/2015 |
| CN | 104270710 | 1/2015 |
| CN | 104284419 | 1/2015 |
| CN | 104486730 | 4/2015 |
| WO | WO 2014/134180 | 9/2014 |

* cited by examiner

DETERMINING RELATIVE POSITION WITH A BLE BEACON

CROSS-REFERENCE TO RELATED APPLICATION

This application claims priority to and is a nonprovisional of U.S. Provisional Patent Application No. 62/195,212, filed on Jul. 21, 2015, with title "Determining Relative Position with a BLE Beacon Using Multiple Co-Located Directional Antenna," the whole document being incorporated herein by reference.

FIELD

The subject technology generally relates to locating beacon technology and, in particular, to wireless, multiple-antenna beacon technology.

BACKGROUND

BLUETOOTH Low Energy (BLE)

Bluetooth Low Energy (also known as Bluetooth LE, BLE, and "BLUETOOTH Smart") is a specification that enables radio frequency communication between various types of devices. One particular portion of the BLE standard is the advertiser/scanner model that allows a device designated as an advertiser device to broadcast information that can be received by one or more scanner devices. BLUETOOTH modules implementing a BLE standard are often integrated into various types of mobile devices that are battery powered.

BLE is used as a wireless personal area network technology. It is designed and marketed by the Bluetooth Special Interest Group (known as the "SIG") and aimed at novel applications in the healthcare, fitness, beacons, security, and home entertainment industries.

Compared to Classic Bluetooth, Bluetooth Smart is intended to provide considerably reduced power consumption and cost while maintaining a similar communication range.

Accordingly, managing power consumption associated with the BLUETOOTH modules is one key performance concern as it pertains to battery life in mobile devices, including smartphones, wearables such as APPLE and ANDROID watches, FITBIT devices, laptop computers, tablet computing systems, and other electronic devices.

Bluetooth Beacons

Bluetooth Beacons are transmitters that use BLE to broadcast signals that can be detected by BLE compatible devices such as smartphones.

An increasing number of manufacturers are providing beacons to the marketplace. Among these are: BlueCats, BlueSense, Estimote, Gelo, Glimworm, Gimbal (by Qualcomm), Kontakt, Sensorberg and Sonic Notify.

IBEACON, an indoor positioning system from Apple Inc., uses BLE to transmit a Universally Unique Identifier (UUID), which is picked up by a compatible smartphone app or operating system on a mobile device. The device can then look up the identifier over the internet to determine the device's physical location or trigger an action on the device such as a check-in on social media or a push notification.

Various vendors (see above) have made hardware iBeacons that come in a variety of form factors, including small coin cell devices, USB sticks, and generic Bluetooth 4.0 capable USB dongles.

Many of these BLE beacons are relatively simple hardware devices that include a BLE System-on-Chip (SoC) device 110, a 2.45 GHz antenna 120, and a power source (not shown), as illustrated schematically as beacon 100 in FIG. 1. The antenna in such embodiments might be an omnidirectional PCB- or chip-based antenna. The battery source may be a coin cell, e.g., a CR2032 or Li-Ion/Li—Po battery pack. The BLE SoC is in some embodiments a single chip that contains a microcontroller, e.g., an ARM M0, running a BLE software stack; a radio frequency (RF) interface; and a number of peripherals.

Beacon Limitations for Location-Based Advertising

Received Signal Strength Indicator (RSSI) is a measurement of the power present in a received radio signal. RSSI measurements can be used by a smartphone or other BLE-enabled device to estimate the distance to the BLE beacon that transmitted the BLE signal.

In principle, being able to determine the distance from a smartphone to a particular beacon is very useful and has many commercial applications including location-based advertising. In practice, RSSI-based measurements have proven to be only an approximate measure of relative distance in location-based advertising applications. Distance estimations based on RSSI measurements are subject to a number of environmental factors that are difficult to account for during beacon design and installation, e.g., the presence of objects (other people, furniture, etc.) between the beacon and the smartphone.

Additionally, basic RSSI measurements do not indicate the direction between the beacon and smartphone—only distance. To date, determining position has been achieved by deploying multiple beacons in a location (e.g., shop or room) and using the RSSI data from all of the available beacons to triangulate position. The limitations of the RSSI method of determining distance and the need to deploy beacons at multiple locations makes this method undesirable in many applications.

DESCRIPTION

Figure 1:
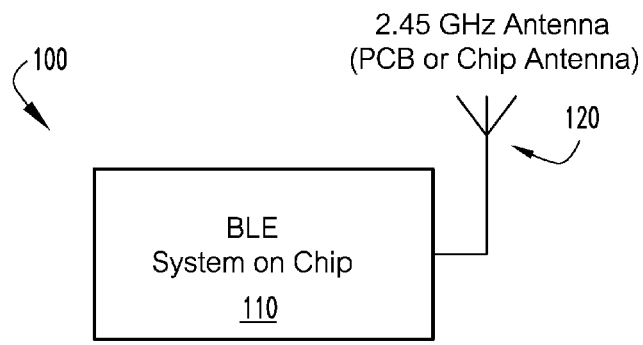
FIG. 1 is a schematic view of a traditional BLE beacon.

For the purpose of promoting an understanding of the principles of the present invention, reference will now be made to certain embodiments, some of which are illustrated in the drawings, and specific language will be used to describe the same. It will, nevertheless, be understood that no limitation of the scope of the invention is thereby intended; any alterations and further modifications of the described or illustrated embodiments, and any further applications of the principles of the invention as illustrated therein, are contemplated as would normally occur to one skilled in the art.

In various embodiments, systems and/or methods are provided for determining relative direction using MCDA (Multiple Co-Located Directional Antennas) for BLUETOOTH Low Energy and other transmission techniques, in addition to the relative distance (RSSI) protocol, substantially as illustrated by and/or described in connection with at least one of the figures, and as set forth more completely in the claims. Additionally, by combining both the methods described (RSSI and MCDA) general accuracy of both parameters may be improved. The new method may also yield substantive improvements in signal transmission distance and/or battery life.

Broadcasting power is the power with which the beacon broadcasts its signal, i.e., the power with which the signal leaves the beacon's antenna. These Broadcast Power settings can be varied. The value ranges between −30 dBm and +4 dBm, lowest to highest power settings respectively. The higher the power, the longer the beacon's range and the more stable the signal, but if the beacon is battery powered, high power may shorten the battery life.

As discussed above, RSSI is the strength of the beacon's signal as seen on the receiving device, e.g. a smartphone. In general, the greater the distance between the device and the beacon, the lesser the strength of the received signal.

This inverse relation between the distance and RSSI is used to estimate the approximate distance between the device and the beacon using another value defined by the iBeacon (Apple) standard: Measured Power.

Measured power is a factory-calibrated, read-only constant property of a beacon which indicates the expected RSSI at a distance of 1 meter to the beacon. Combined with RSSI, this allows a method of estimating the actual distance between the device and the beacon.

Note that, due to external factors which influence the Bluetooth radio wave broadcasted by beacons—such as absorption, interference or diffraction—the RSSI value tends to fluctuate. The further away the device is from the beacon, the more unstable the RSSI readings will be. And, since distance approximation is based on RSSI, this directly translates to less accurate estimates at greater distances.

Reflective, Absorbing/Blocking Materials

The table below shows common types of barrier material and their potential for interference.

Radio Frequency (RF) Reflective and Absorbing/Blocking Obstructions

| Type of Barrier | Interference Potential |
| --- | --- |
| Wood | Low |
| Synthetic material | Low |
| Glass | Low |
| Water | Medium |
| Bricks | Medium |
| Marble | Medium |
| Humans | Medium to high |
| Plaster | High |
| Concrete | High |
| Bulletproof glass | High |
| Metal | Very high |

EM signals are also affected by barometric pressures and atmospheric changes.

Antennas and Directionality

This disclosure describes parameters to relating to antenna use in a short range Bluetooth Low Emission device application. Antenna parameters, different antenna types, design aspects and techniques for characterizing antennas are issues that are addressed. Radiation pattern, gain, impedance matching, bandwidth, size and cost are also considered.

The antenna is a key component for reaching the maximum distance in any wireless communication system. The purpose of an antenna is to transform electrical signals into RF electromagnetic waves, propagating into free space (transmit mode) and to transform RF electromagnetic waves into electrical signals (receive mode).

Similar to uses for specialized antenna or directional microphones—in certain business environments it would be highly advantageous to create beacons with unidirectional, bi-directional, cardioid, conical or other broadcast patterns.

These electromagnetic broadcast patterns are often called "Polar Patterns." In our examples, these patterns are mainly used to describe the shape of strengths of transmitted signals as compared to an "isotropic radiator." An isotropic radiator is a theoretical point source of electromagnetic or sound waves which radiates the same intensity of radiation in all directions. It has no preferred direction of radiation. It radiates uniformly in all directions over a sphere centered on the source. Isotropic radiators are used as reference radiators with which other sources are compared.

For our purposes, creating specific directional patterns of transmission and reception also play significant roles. The three most commonly used antenna types for short range devices like BLE beacons are PCB antennas, chip antennas and wire antennas. There are many known antenna designs enhanced with specific software that optimizes their performance.

Antennas from companies like Pinyon are specifically designed for directional operation and Fractus offers compact designs as standard chip antennas.

An alternative to the Pinyon antenna, a standard "patch" antenna or "YAGI" antenna will also give directionality. The patch antenna mainly radiates in just one direction (one main lobe), whereas the IP Pinyon antenna has two lobes, similar to a figure eight. The YAGI antenna usually has a higher gain than the patch antenna and is typically larger in size as well.

Our method relies on a combination of software methods and hardware in communication with a mobile operating system to achieve directionality in a BLE beacon.

BLE Beacons and UDID Numbers

Beacons (aka iBeacons) are very small devices that transmit small packets of data using the Bluetooth Low Energy (aka Bluetooth LE, BLE, Bluetooth Smart, or Bluetooth 4.0) standard.

As the name implies, one of the key attributes of beacons is they consume very little power, enabling them to last up to 2 years on a coin battery.

Just as importantly, they don't drain a Smart Device's battery as drastically as GPS or Wi-Fi connections do.

Contrary to popular belief, these beacons do not send out offers or alerts to phones. Rather, they send what's known as "Advertising packets"—small bits of data that identify the unique beacon, not advertising products, but their identity. The main parameters are the UDID (Unique Device IDentifier) and Major and Minor values. Currently, BLE beacons use a common UDID with different Major/Minor values. This is how mobile devices determine one beacon from another.

Directionality

Imagine if we could mount two or more directional antenna in a BLE beacon. For this example consider:

2-Way Directionality 2 directional antenna aligned opposite each other. We could call this a "Left/Right" or "North/South" arrangement.

4-Way Directionality 4 directional antenna aligned in (N-S-E-W) North South East and West directions.

2-Way Use Cases

Consider entry and exit ways: if a smartphone user approaches a doorway and walks directly toward a beacon we might send them a welcome message or alert. Then when the user is receding—walking away from the beacon—we might send an exit or "Thank You for Coming" message. This works well in certain use cases. However, using the current omnidirectional beacons, many false positives are created when visitors pass by doorways in a parallel direction. Or consider a restaurant where the user may enter and sit at a table to eat. If the user walks to the restroom or another area that is farther away from the beacon we might infer that the user is leaving, when they are only walking around inside the space.

We believe it is possible to create directionality using 2 or more antenna designed to focus one beacon facing the exterior and another facing the interior of the same doorway. This would ensure more accurate messaging to visitors entering and exiting the business.

Or consider a customer pumping gas. Pumps are usually set up allowing customers to access pumps on both sides of an island. Consider a beacon placed on top of the group of pumps. A traditional beacon radiates equally in all directions so, with a single beacon, there is currently no way to determine if a customer is on a particular side of the island. On Pump A or Pump B. We could solve this with directional beacons.

4-Way Use Cases

In this method our BLE beacon is enabled with a switch that continuously switches from one antenna to the next, by either turning the 4 antenna on and off in a rotational cycle or pulsing the power higher and lower one antenna at a time.

Then a user carrying a smartphone comes in range. The smartphone, which is connected to a service, detects one or more of the directional beacon signals. Depending on the degree of directionality of each of the 4 antenna, the phone and its service would receive signals of varying signal strength from one or more antenna. These antenna signals would be individually coded with major/minor ID's. With this method we could generate an MCDA protocol to provide directional information and use the RSID protocol to determine distance with a single beacon with multiple antenna.

In some cases a user's smart phone might pick up signals from only one of the four antenna giving a North, South, East or West direction. In other cases—if there was some signal pattern overlap, a user's smartphone might pick up signals from two antenna. One signal could be slightly stronger than the other. This might provide more than a simple 4-way set of directions. We might have Southwest, Northeast and variants in between two antenna—possibly allowing 8 or more directional variants.

If this beacon is set to alternate between/among antenna at a particular speed, and the beacon is oriented in a particular NSEW direction, then the data provided to the receiver will allow us to calculate the relative position similar to degrees of the compass. And we could know where mobile devices and their users are located laterally to a particular beacon. This is another method that would create a new "smarter" geolocation context without multi-beacon triangulation.

Omni-Directional Antenna in Conjunction With 1 or More Co-Located Directional Antennas on a BLE Device In another embodiment we will use an omnidirectional antenna using RSSI calculations and compare them with the data gathered from a directional antenna. Each antenna type will generate different amounts of electromagnetic energy as measured by a device from a certain distance. So the amount of signal strength will vary even though the receiving antenna is at a specific distance to the co-located antenna. By measuring these differences in received signal strength we will develop algorithms based on each specific antenna set. The comparative values will provide more accurate data by averaging two data sets based on RSSi at a particular distance.

And based on the above methods, one can determine factors related to location and distance, which translates to a more precise method of figuring relative position.

Directional Beacons

Overview

A new type of beacon is envisaged to enhance the effectiveness of BLE beacons in location-based advertising applications.

Rather than use a single omnidirectional antenna (one which radiates radio wave power uniformly in all directions in one plane), "directional" beacons will use multiple directional antenna, each of which radiates power in a particular direction.

Definitions & Terms

Relative position means the position between a beacon and a device, such as a receiver compatible with the beacon.

Co-location refers to antenna located within a few wavelengths of each other at their nearest points. In some embodiments, this is on the order of centimeters.

Directional antennas allow for different RSSI measurements from the one location as opposed to multiple omnidirectional antennas returning identical RSSI values.

Instead of GPS-style satellites positioned thousands of miles apart and tens of thousands of miles in space—allowing for time of flight calculations to determine location of a position on the earth, our proprietary method; some embodiments of the present disclosure use variants of the Friis Equation to calculate RSSI distance and lateral angular offset.

Figure 2:
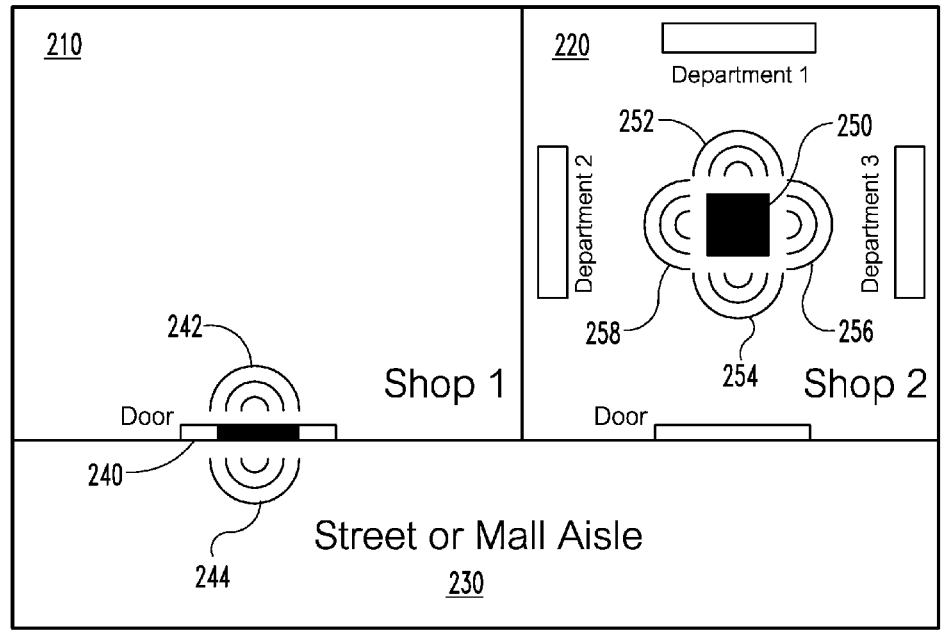
FIG. 2 is a plan view of two exemplary implementations of locating systems according to respective embodiments of the present disclosure.

FIG. 2 illustrates two potential applications of "directional" beacons according to the present disclosure. In this embodiment, two adjacent shops (Shop 1 (210) and Shop 2 (220)) and a street front or mall aisle (230) are shown. In Shop 1 (210), a "dual antenna" BLE beacon (240) is placed over the door. The two antennas (242, 244) on this beacon radiate energy in opposite directions—labeled here for convenience as North and South. In this application, different BLE advertising packets can be directed to smartphones on the street (230) and in the shop (210). For example, the South-facing antenna (244) transmits BLE advertising packets that can be used to invite passers-by into the shop (210). Once inside the shop (210), the North-facing antenna (242) transmits BLE advertising packets that can be used to thank shoppers for entering the shop (210).

In Shop 2 (220), a "quad-antenna" BLE beacon (250) is placed in the center of the shop (220). The four antennas (252, 254, 256, 258) on this beacon (250) radiate energy in four different directions—labeled here for convenience as North, South, East and West. In this application, different BLE advertising packets can be directed to smartphones, mobile devices, or other receivers in different departments of the shop (220). Thus, the single quad-antenna beacon (250) can replace multiple traditional beacons. A shopper's approximate position can be determined by comparing the RSSI measurements from each antenna as discussed below with reference to FIG. 5.

Figure 3:
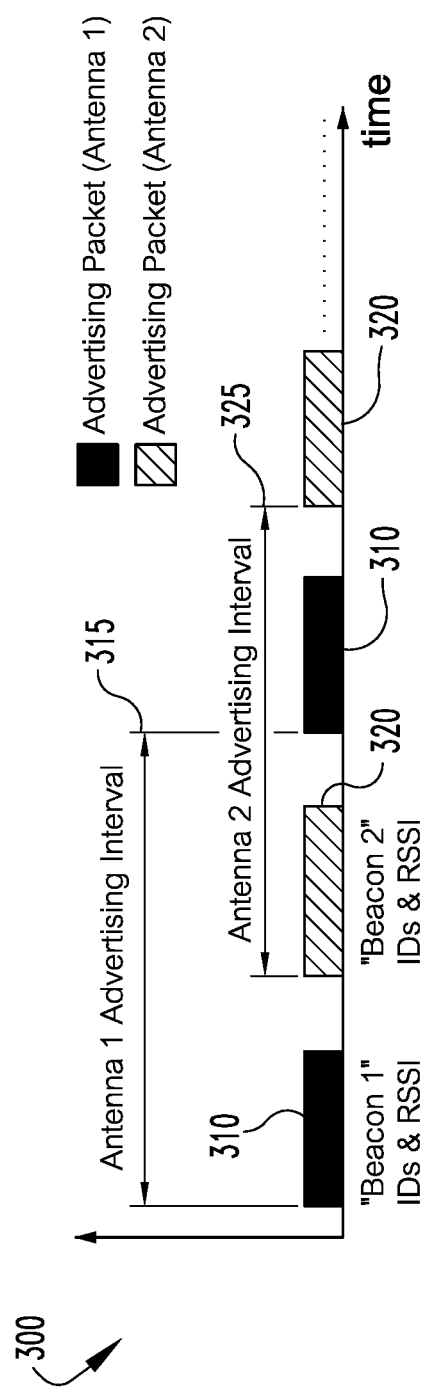
FIG. 3 is a timing diagram showing interleaving of advertising packets in a dual-antenna embodiment of the present disclosure.

In BLE based advertising schemes, such as iBeacon, the SoC transmits identification packets periodically. The advertising packet contains a beacon ID and an expected RSSI value at a specific distance, e.g., 1 meter. The advertising interval (i.e., the interval of time between the beginning of consecutive advertising packets) is typically between 100 ms and 2 s. To implement a "directional" beacon according to the present disclosure, a single SoC can interleave multiple such packet streams as shown in timing diagram (300), for example, in FIG. 3. In this example, signals are sent through a first antenna in a first direction as packets (310) with advertising interval (315), while signals are sent through a second antenna in a second direction as packets (320) with advertising interval (325). In some implementations, advertising interval (315) and advertising interval (325) are the same, while in other implementations they are different. In some implementations, the lengths of advertising packets (310, 320) through different antennas are the same, while in other implementations they are different. (Note that the consistent height of the bars that illustrate packets (310, 320) in timing diagram (300) is not intended to imply that such advertising packets must use the same power level at all times, nor that all antenna must use the same power level.)

Dual-antenna BLE beacons may have two interleaved streams. Quad-antenna BLE beacons may have four interleaved streams. It is also feasible to implement beacons with 3, 5, or more antenna, but as the number of combined antennas increases, achieving the desired minimum advertising interval for each antenna will eventually become a limiting factor. Beacon power consumption can also be expected to rise for each additional antenna as the amount of time that the SoC remains in "sleep mode" is reduced.

Position Estimation Using "Directional" Beacons

If a device receives advertising packets from multiple traditional beacons, the RSSI measurements from each beacon can be used to estimate the device's position relative to the beacons by the triangulation method, similar to that used for GPS.

Antenna Theory

In antenna theory, an isotropic antenna is a hypothetical antenna radiating the same intensity of radio waves in all directions. It thus is said to have a directivity of 0 dBi (dB relative to isotropic) in all directions.

Even though an isotropic antenna cannot exist in practice, antenna directivity is usually compared to the directivity of an ideal isotropic radiator, because an antenna's power gain (which expresses the antenna's directivity multiplied by the antenna efficiency) relative to an isotropic radiator is easily understood and is used. A good example of this theory in use is the "Friis Transmission Equation" shown just below. In this model, for a lossless antenna (antenna efficiency of 100%), the gain averaged over all directions is unity, adding up to the efficiency of the isotropic.

The Friis Transmission Equation $$\frac{P_r}{P_t} = G_t(\theta_t, \phi_t) G_r(\theta_r, \phi_r) \left(\frac{\lambda}{4\pi R}\right)^2 (1-|\Gamma_t|^2)(1-|\Gamma_r|^2)|a_l \cdot a_r^*|^2 e^{-\alpha R}$$

Isotropic Receiver

In EMF measurements, like radio wave and microwave applications, an isotropic receiver (also called an isotropic antenna) is a field measurement instrument which allows one to obtain the total field independently of the tri-axial orthogonal arrangement chosen for orientation of the device itself. The parameter used to define accuracy in the measurements is called isotropic deviation.

So, much like GPS measures the position of the user in relation to the satellite transmitters, we calculate power variation from an array of directional BLE devices and measure isotropic deviation to obtain the position of other antennas within the BLE signal area.

Figure 4:
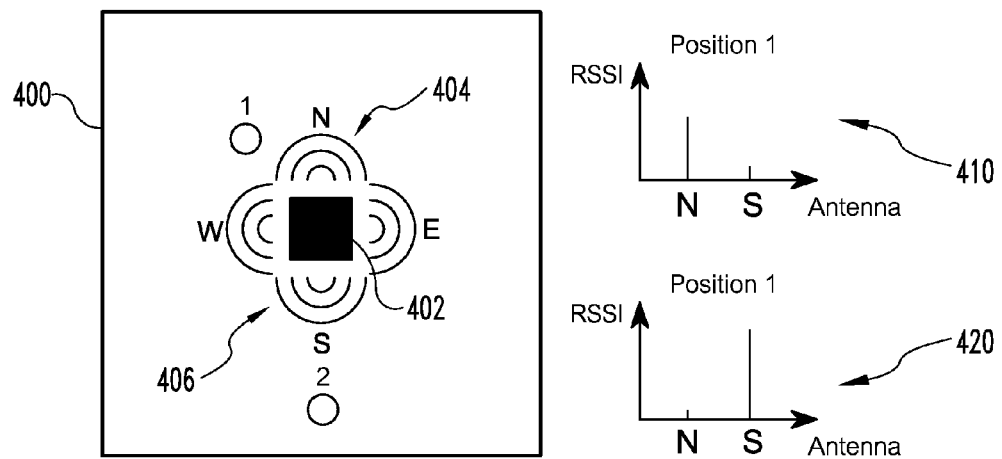
FIG. 4 is a signal diagram showing received signal strength in a dual-antenna embodiment of the present disclosure.
Figure 5:
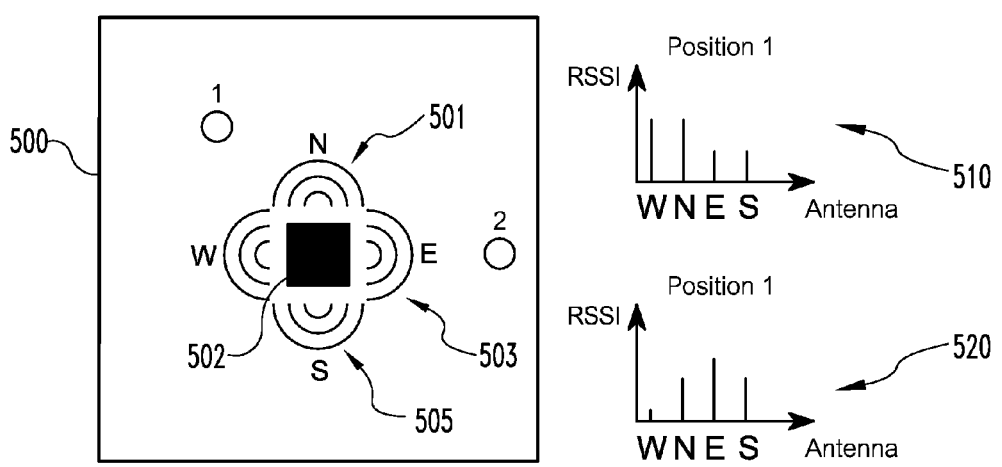
FIG. 5 is signal diagram showing received signal strength in a quad-antenna embodiment of the present disclosure.

FIGS. 4 and 5 illustrate an alternative approach using "directional" beacons. A single "directional" beacon can make multiple RSSI measurements available to a receiver. In exemplary scenario (400), dual-antenna beacon (402) has a North-oriented antenna (404) and a South-oriented antenna (406). The power levels received at a given location—relative to the calibrated values and to each other—provide information about the location relative to the beacon (402) and the directions of the two antennas (404, 406). For example, at Position 1 in scenario (400), the signal from the North-oriented antenna (404) is received at a relatively high level, while the signal from the South-oriented antenna (406) is received at a relatively low level, all of which is illustrated in signal strength graph (410). Similarly, at Position 2 in scenario (400), the signal from the door-oriented antenna (404) is received at a very low level, while the signal from the South-oriented antenna (46) is received at a high level, all as illustrated in signal strength graph (420).

Turning to FIG. 5, scenario (500) illustrates 4-antenna beacon (502) with North-, East-, South-, and West-oriented antennas (501, 503, 505, 507). Thus, at Position 1, the signals from North-oriented antenna (501) and West-oriented antenna (507) are moderately high, while the signals from East-oriented antenna (503) and South-oriented antenna (505) are significantly weaker, all as shown in signal strength graph (510). At Position 2, the signal from East-oriented antenna (503) will be strong, the signals from North-oriented antenna (501) and self-oriented antenna 505) will be moderate, and the signal from West-oriented antenna (507) will be weak, all as shown in signal strength graph (520).

These signal levels can be processed to determine the smartphone's position as a function of the received signal strengths from multiple directional antennas even though all of the antennas are co-located.

The Location Algorithm

In many applications, coarse position estimation is sufficient. For example, referring to Shop 1 (210) in FIG. 2, it is sufficient to know whether the smartphone is located in the shop (210) or on the street (230). A "dual-antenna" directional beacon (240) provides this information.

Where finer positional granularity is required, e.g., identifying which department 0a customer in Shop 2 (220) is standing in, one or more "quad-antenna" directional beacons (250) can provide this information.

Dual-Antenna BLE Beacon Implementation

Figure 6:
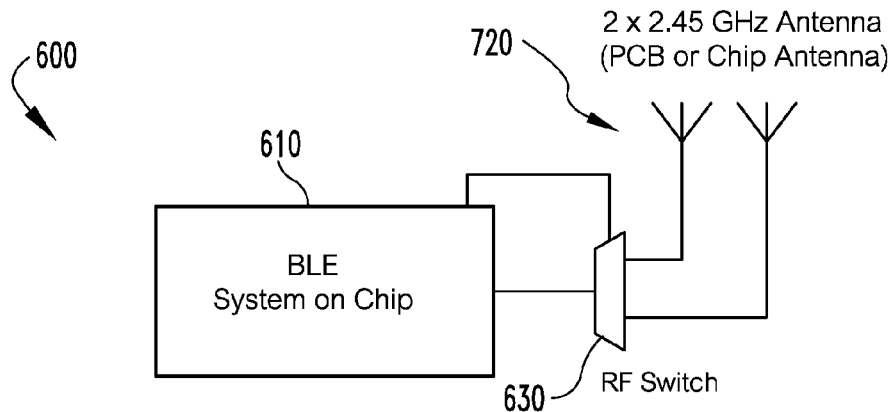
FIG. 6 is a schematic diagram of a PCB-based, dual-antenna embodiment of the present disclosure.
Figure 7:
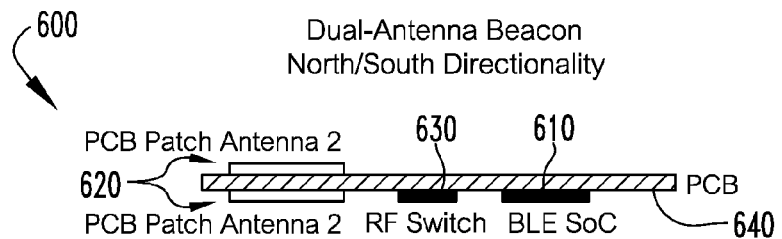
FIG. 7 is a side view of the embodiment of FIG. 6.
Figure 8:
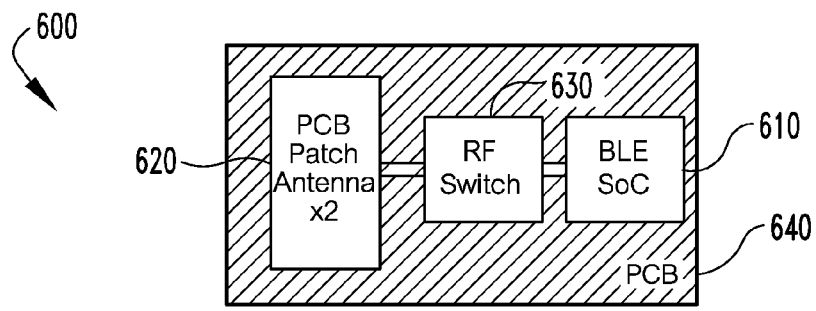
FIG. 8 is a top view of the embodiment of FIG. 6.

FIGS. 6-8 show an exemplary implementation of a "dual antenna" directional beacon (600) using a nRF51822 BLE SoC (610). Each of the two antennas (620) is implemented as a PCB patch antenna on one side of the PCB (640) used to mount the nRF51822 (610), the RF switch (630), battery and other electronic components (not shown).

Quad-Antenna BLE Beacon Implementation

Figure 9:
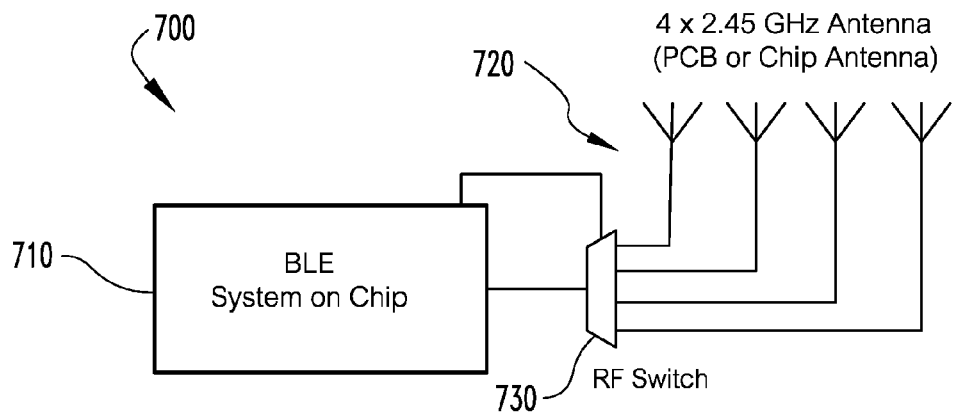
FIG. 9 is a schematic diagram of a PCB-based, quad-antenna embodiment of the present disclosure.
Figure 10:
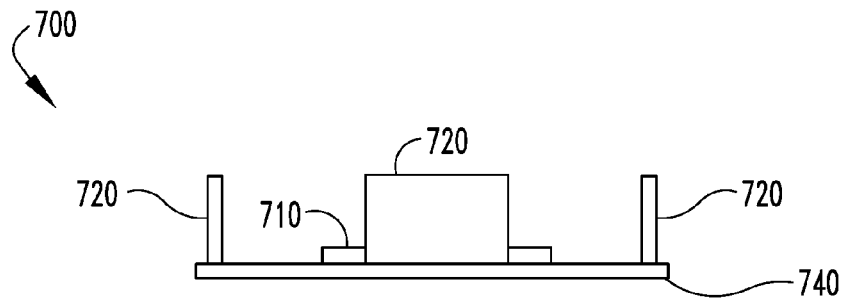
FIG. 10 is a side view of the embodiment of FIG. 9.
Figure 11:
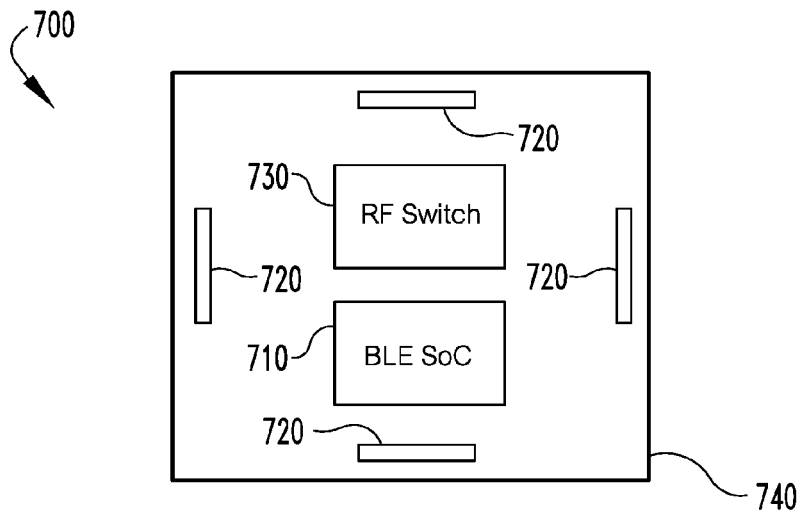
FIG. 11 is a top view of the embodiment of FIG. 9.

FIGS. 9-11 show an exemplary implementation of a "quad antenna" directional beacon (700) using the nRF51822 BLE SoC (710). Each of the four antennas (720) is implemented as a PCB patch antenna that is connected to the PCB (740) used to mount the nRF51822 (710), the RF switch (730), battery and other electronic components (not shown).

Mobile Device Localization in BLE/Wi-Fi/Data Networks

In broad terms, localization of sensors and mobile devices is valuable for real-world applications over various types of Wireless Sensor Networks (WSNs)—this includes Bluetooth, Wi-Fi and data networks. Many devices within the heralded "Internet of Things" need accurate location measurements to operate optimally. In nearly all types of networks (and hybrid networks involving one or more wireless transmission frequencies and encoding techniques), electromagnetic (EM) signal propagation irregularity and stringent constraints on hardware cost, make accurate localization very challenging.

As an alternative to RSSI, which is a range-based method, range-free localizations are also useful, since they do not depend only on received signal strength to estimate distance. And they tend to perform well with inexpensive hardware devices. Combining the two methods delivers an even more accurate model for determining the location of a mobile device in relation to a Bluetooth LE sensor particularly in a network employing fixed devices and moving devices.

The disclosure above lays out the advantages of multiple co-located directional antennas (MCDAs) in determining relative location with 2-way and 4-way antennas. Even in embodiments with no overlap between the signals from the directional antennas, the system can still determine 2 or 4 discrete locations.

However, just as RSSI allows a measurement of distance if a standard "Measured Power" is calibrated, combining with RSSI, MCDA allows one to estimate the actual distance between the device and the beacon plus a greater degree of accuracy in determining relative location of the receiving device.

Some embodiments of this system and method use signal-overlapping, for example, using Signal Overlapping based on Comparison of Received Signal Strength Indicator (SOCRSSI) from multiple co-located antenna on a single device to achieve high estimation accuracy of location and distance.

In other embodiments, a method may also employ both the signal strength decrease based on distance from the point of origin (range localization using the Friis Equation)—and a pattern of lateral signal decay (range-free localization) common to directional antennas.

8-Way (or Greater) Location Using Signals from 4 Overlapping Antennas

Figure 12:
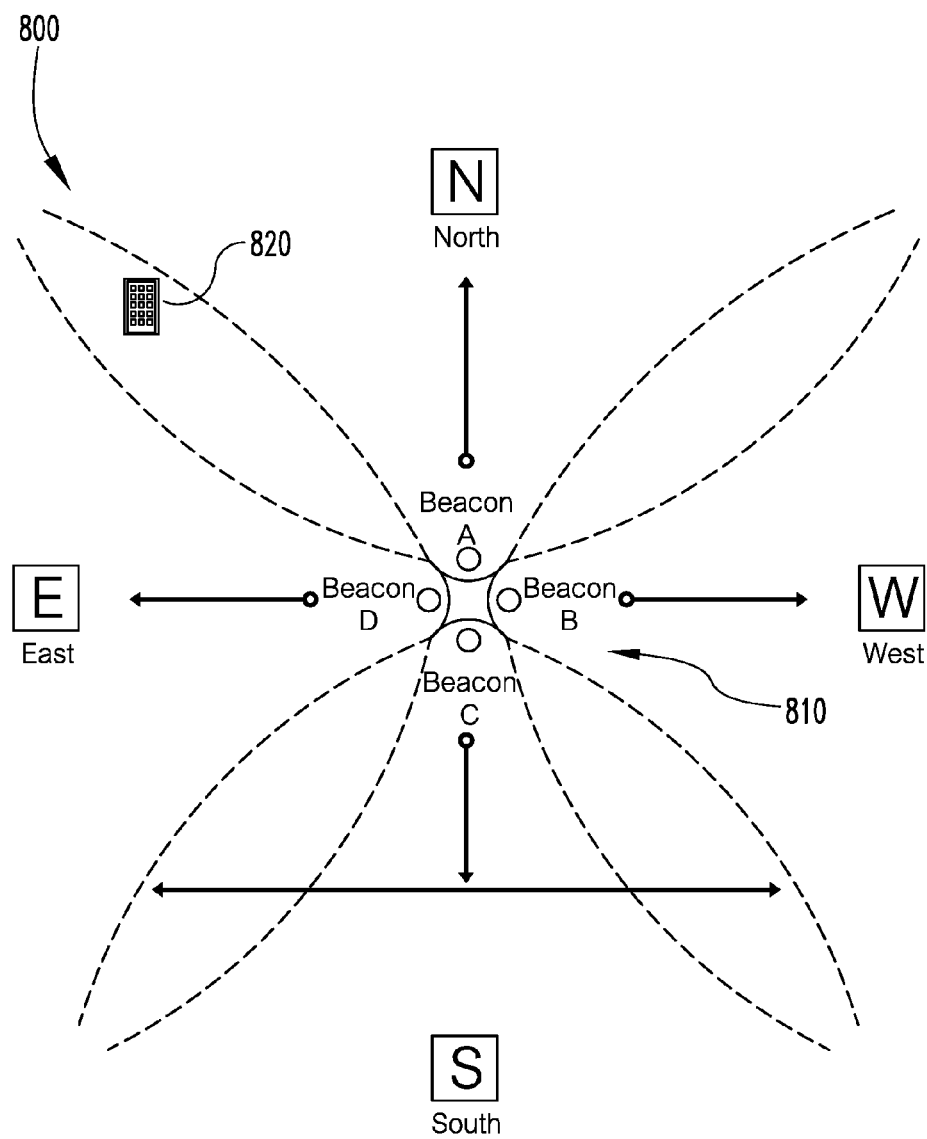
FIG. 12 is a plan-schematic view of a mobile device in the vicinity of a quad-antenna beacon according to the present disclosure.

In the scenario (800) illustrated in FIG. 12, where 4-antenna beacon (810) is NSEW-oriented, mobile device (820) can clearly determine 4 directional locations in relation to the multiple co-located directional antennas of beacon (810), but depending on the amount of signal overlap, mobile device (820) can in some embodiments place itself in at least 8 locations.

Range-Free Localization of a Mobile Device in Wireless Sensor Networks

Location information plays a crucial role in understanding the application context between sensors and objects in WSNs, and many localization algorithms for WSNs have been proposed to provide per-node location information. These node location estimates are an essential part of "mesh" technology deployments.

Location methods can be divided into two categories: range-based methods and range-free methods. Range-based localization depends on the assumption that the absolute distance between a sender and a receiver can be estimated by received signal strength or by the time-of-flight of a communication signal from the sender to the receiver. As we have illustrated, however, the accuracy of such estimation is subject to variation due to the transmission medium and surrounding environment. These factors may greatly affect the accuracy of these RSSI measurements. In contrast, range-free localization does not attempt to estimate the absolute point-to-point distance based on received signal strength. As such, rang-free localization is very appealing for any WSN.

This method, Signal Overlapping based on Comparison of Received Signal Strength Indicator (SOCRSSI), uses signal overlapping to estimate the location of a mobile device (receiver) in relation to the multiple co-located antenna in a BLE beacon. Compared to triangulation overlapping, signal overlapping from co-located antennas performs well for randomly deployed WSNs among existing range-free localization approaches, generates small intersection areas and results in more accurate location estimation. Finally, the proposed signal-overlapping method may be especially useful by providing alternate data under irregular radio propagation patterns.

Overlapping EM Transmission Signal Rings and Transmission Signal Ring Overlapping Based on Comparison of Received Signal Strength Indicators (SOCRSSI)

Figure 13B:
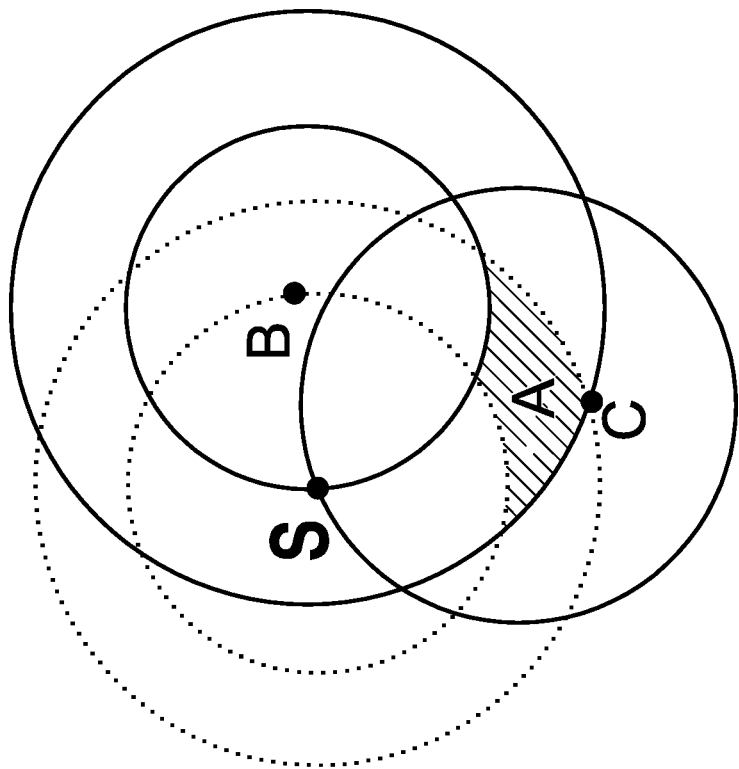
FIG. 13(b) is a schematic diagram illustrating signal rings in the embodiment of FIG. 13(a).
Figure 13A:
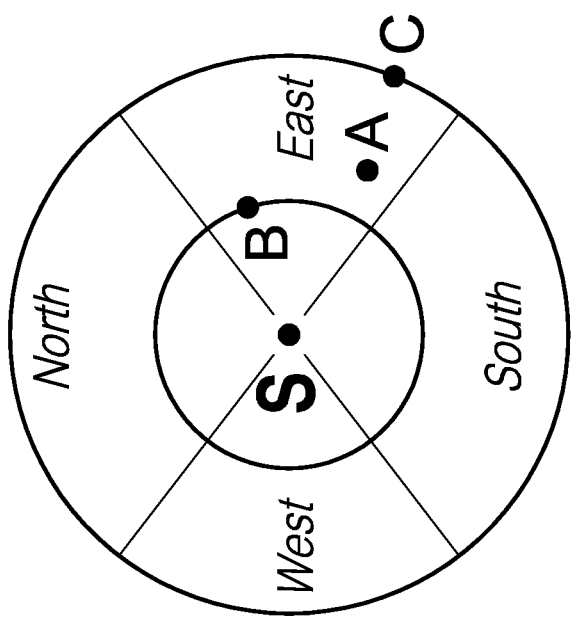
FIG. 13($a$) is a schematic diagram illustrating three mobile devices in the vicinity of a beacon according to an embodiment of the present disclosure.

In FIG. 13, a mobile device A receives the locating signal from the MCDA BLE beacon S and one or more other mobile devices B and C.

The general idea of SOCRSSI is that each sensor node uses a series of overlapping signals to narrow down the possible area in which it resides. As shown in FIG. 13(b), if A can determine that its distance to S is larger than the distance between A and B, but less than the distance between A and C, it can conclude that S falls within the signal center at S with the inner radius equal to the distance between A and B and the outer radius equal to the distance between A and C. Similarly, S can figure out another signal centered at anchor B, and a circle centered at anchor C. Then it calculates the intersection area of these signals (or circles) and takes the probability of this area as its estimated location.

We also understand, based on the multiple co-located directional antennas of device S, that all three locations A, B and C are East of the sensor. Therefore, not only can we obtain the relative direction and distance information from sensor S, but we can also triangulate sensor S with the user A and one or more other mobile devices. This provides still more information that can be used to more accurately determine the location of a particular mobile device, A, and its relation to the sensor S.

Reconsidering RSSI Propagation

At the initial transmission send/receive period, each BLE MCDA device in the illustrated embodiments broadcasts a specific number of beacon messages for each of its directional antennas. During this period or cycle, each of the neighboring mobile devices will constantly sample received signal strength. At the end of this period (for example, when the number of broadcast beacon messages in each anchor has reached a predefined number), at the very least, the receiver will know its direction and distance (via RSSI) of one mobile device from our MCDA sensor.

Yet if we account for all neighboring signals from other mobile devices (presuming they are Bluetooth-enabled), we can calculate the mean of these measured signal strengths. For our example, mobile device A will store the mean value for later use. The MCDA device will continually broadcast an RSSI message from each of its directional antennas, and one or more of these directional signals will be received by the mobile device A. This will give device A the mean value of the measured signal strength, its own ID, the ID of the MCDA device and the antennas from which the signals have been received (the one or more antennas that have been measured), and its own relative location information. Any other mobile device that receives the MCDA RSSI message will record the same related information.

When mobile device A obtains enough information after the initial RSSI propagation stage, it can make use of the information to calculate its own relative location using the Friis algorithm, but with additional directional information, for example, using a modification of Friis that excludes or otherwise accommodates for a lack of data from the directions from which the device is NOT receiving signals.

MCDA in Conjunction with RSSI and Ring Overlap

The basic idea is to generate a series of signals, each of which A falls within, narrowed to only certain antennas. Device A then calculates the intersection area of these signals with devices B and C, and this takes the probability of the final intersection area as its more accurately estimated location.

Once all possible signals are calculated, we can scan the whole field created by these multiple BLE devices to find the area with the maximum numerical value, then take this area as the final intersection area and calculate its probability.

If we use Bayesian inference to enhance these numbers, it is easy to see that, using multiple fields of EM Signal Transmission Overlap with MCDA enabled devices, a receiver can generate the smallest possible granularity of location error. As will be understood by those skilled in the art, Bayesian inference derives the posterior probability as a consequence of two antecedents, a prior probability and a "likelihood function" derived from a statistical model for the observed data. Bayesian inference computes the posterior probability according to Bayes' theorem:

$$P(H \mid E) = \frac{P(E \mid H) \cdot P(H)}{P(E)}$$

Figure 14:
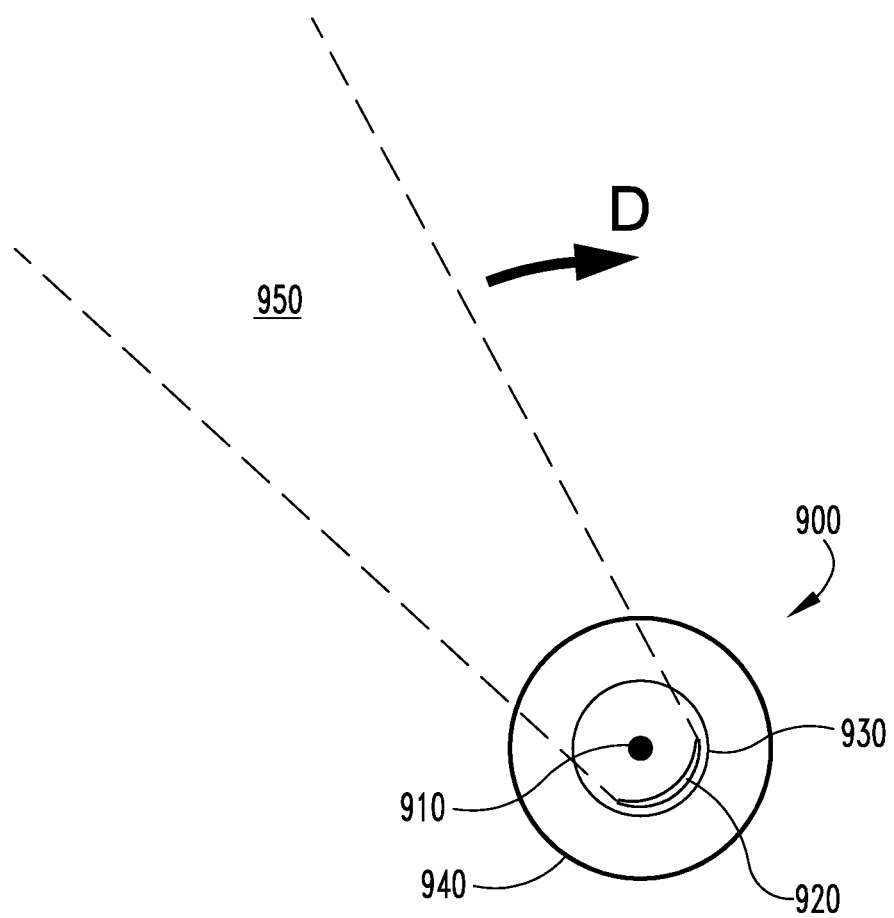
FIG. 14 is a schematic diagram of a beacon that uses a combination of omnidirectional and rotating components.

FIG. 14 illustrates yet another embodiment according to the present disclosure. Here, beacon (900) comprises an omnidirectional antenna (910) that generates RSSi signals. When omnidirectional antenna (910) detects a mobile user within range, beacon (900) activates directional antenna (920) to begin transmitting a directional locating signal (950) as discussed herein. In the illustrated embodiment, directional antenna (920) uses a small parabolic dish, while in other embodiments (and likewise with reference to other embodiments described herein) alternative forms of directional antennas will be used. Turntable (930) on which directional antenna (920) sits then rotates atop base (940) so that directional locating signal (950) sweeps through its range in rotational direction D to generate directional information, such as by using the PVIP protocol. The combination of the ranging (e.g., RSSi) data from omnidirectional antenna (910) and direction (e.g., PVIP) data from directional antenna (920) can yield quite accurate location information from a single beacon (900).

In another embodiment, an omnidirectional antenna (similar to antenna (910)) could be placed nearby, but not be co-located with a selectively active, rotating, directional antenna (like antenna (920)). The location of a receiver can then be determined with great accuracy by combining the range data available from the omnidirectional antenna with the directional data available from the rotating unidirectional antenna. In implementations that use device detection by one beacon to activate the other beacon, overall power savings can also be achieved.

The various controller and/or processing activities performed by the various implementations of this system and method are implemented using special programming stored in a memory device and executed by a controller or processor, all as will occur to those skilled in the art. For example, a "processor" or "controller," as this example has generically been referred to, includes a processor in communication with a memory, input interface(s), and output interface(s). The memory stores a variety of data, but is also encoded with programming instructions executable to perform the functions described. Power, ground, clock, and other signals and circuitry are used as appropriate as will be understood and easily implemented by those skilled in the art.

The input interface(s) manage communication between the processor and one or more touch screens, sensors, pushbuttons, UARTs, IR and/or RF receivers or transceivers, decoders, or other devices, as well as traditional keyboard and mouse devices. Output interface(s) provide a video signal to a display, and may provide signals to one or more additional output devices such as LEDs, LCDs, or audio output devices, local multimedia devices, local notification devices, or a combination of these and other output devices and techniques as will occur to those skilled in the art.

The processor in some embodiments is a microcontroller or general purpose microprocessor that reads its program from the memory. The processor may be comprised of one or more components configured as a single unit. Alternatively, when of a multi-component form, the processor may have one or more components located remotely relative to the others. One or more components of the processor may be of the electronic variety including digital circuitry, analog circuitry, or both. In some embodiments, the processor is of a conventional, integrated circuit microprocessor arrangement. In some embodiments, one or more reduced instruction set computer (RISC) processors, graphics processing units (GPU), application-specific integrated circuits (ASICs), general-purpose microprocessors, programmable logic arrays or other devices may be used alone or in combinations as will occur to those skilled in the art.

Likewise, the memory in various embodiments includes one or more types such as solid-state electronic memory, magnetic memory, or optical memory, just to name a few. By way of non-limiting example, the memory can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge medium; a solid-state or hybrid drive; or a plurality and/or combination of these memory types. Also, the memory in various embodiments is volatile, nonvolatile, or a hybrid combination of volatile and nonvolatile varieties.

All publications, prior applications, and other documents cited herein are hereby incorporated by reference in their entirety as if each had been individually incorporated by reference and fully set forth. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A location reference system, comprising: a beacon comprising a plurality of co-located antennas, including a first antenna that selectively transmits a directional reference signal, and a second antenna that omnidirectionally transmits a ranging reference signal; a controller; and a memory in communication with the controller, the memory being programmed with instructions executable by the controller to compare data gathered from the first antenna and the second antenna to determine a position of a receiver.

2. The system of claim 1, wherein: the plurality of co-located antennas further comprises a third antenna that selectively transmits a directional reference signal; the first antenna and the third antenna each have a center direction, and the center direction of the first antenna and the center direction of the third antenna are substantially opposite directions.

3. The system of claim 1, wherein: the plurality of co-located antennas further includes a third antenna and a fourth antenna; and the first antenna, the second antenna, the third antenna, and the fourth antenna each have a center direction that is at a substantially right angle to the respective center directions of at least two other ones of the plurality of co-located antennas.

4. The system of claim 1, wherein each of the plurality of co-located antennas has a center direction; and the center directions of all of the plurality of co-located antennas are not substantially coplanar.

5. The signal of claim 1, wherein a signal transmitted by a first one of the plurality of antennas can be received in at least one location where the signal transmitted by a second one of the plurality of antennas can be received.

6. The system of claim 1, wherein the controller selectively activates each of the plurality of co-located antennas so that the transmissions of the plurality of antennas are interleaved.

7. The system of claim 1, further comprising a receiver that includes: a receiving antenna tuned to receive the reference signals transmitted by each of the plurality of antennas; a processor in communication with the receiving antenna; and a memory in communication with the processor, the memory being encoded with programming instructions executable by the processor to process one or more reference signals received from a corresponding one or more antennas in the plurality of antennas.

8. The system of claim 7, where the processing of the received reference signals yields a direction of the receiver relative to the plurality of co-located antennas.

9. The system of claim 7, where the processing of the received reference signals yields a position of the receiver relative to the plurality of co-located antennas.

10. The system of claim 1, wherein the plurality of antennas transmit the reference signals using a Bluetooth protocol.

11. A method of providing location reference signals, comprising the steps of: transmitting a first reference signal from a first antenna, the first reference signal being a directional reference signal; transmitting a second reference signal from a second antenna, the second antenna being substantially co-located with the first antenna; and processing data gathered from the first reference signal with data gathered from the second reference signal to determine a position of a receiver.

12. The method of providing location reference signals of claim 11, wherein the first reference signal has a first centerline and the second reference signal has a second centerline, further comprising: transmitting a third reference signal from a third antenna having a third centerline; and transmitting a fourth reference signal from a fourth antenna having a fourth centerline, wherein the third antenna and the fourth antenna are substantially co-located with the first antenna and the second antenna; the third centerline and the fourth centerline are angularly spaced apart from each other and from the first centerline and the second centerline, and the third reference signal and the fourth reference signal each consist of one or more of a directional reference signal and a ranging reference signal.

13. The method of providing location reference signals of claim 12, wherein: the first centerline and the second centerline are in substantially opposite directions from each other; the third centerline and the fourth centerline are in substantially opposite directions from each other; and the first centerline and the third centerline form a substantially right angle.

14. The method of providing location reference signals of claim 11, wherein the first reference signal has a first centerline and the second reference signal has a second centerline, and the first centerline and the second centerline are substantially coplanar.

15. The method of providing location reference signals of claim 11, wherein the first reference signal and the second reference signal can both be received by a receiver in at least one location.

16. The method of providing location reference signals of claim 11, further comprising: receiving the first reference signal and the second reference signal at a receiver; and processing one or more of the received first reference signal and the received second reference signal to yield the relative direction of the receiver from the common location of the first antenna and the second antenna.

17. The method of providing location reference signals of claim 11, further comprising: receiving the first reference signal and the second reference signal at a receiver; processing one or more of the first reference signal and the second reference signal to yield the relative position of the receiver relative to the common location of the first antenna and the second unidirectional antenna.

18. The method of providing location reference signals of claim 11, wherein the transmitting is performed using a Bluetooth protocol.

19. A location reference system, comprising: a controller; a beacon comprising an omnidirectional antenna and a unidirectional antenna, the omnidirectional antenna transmitting a ranging reference signal, and the unidirectional antenna being selectively activatable to transmit a directional reference signal; and a memory in communication with the controller, the memory being programmed with instructions executable by the controller to activate the unidirectional antenna when the omnidirectional antenna detects the presence of a receiver.

20. The system of claim 19, further comprising a turntable supporting the unidirectional antenna, and wherein the turntable sweeps the directional reference signal rotationally to generate directional information.

* * * * *